April 13, 1965  J. C. WHYTE  3,177,707
TESTING EQUIPMENT FOR FUEL INJECTION ENGINES
Filed April 13, 1962  2 Sheets-Sheet 1

INVENTOR
Nina Whyte,
executrix of the estate
of John Christopher Whyte

BY Mawhinney & Mawhinney
ATTORNEYS

April 13, 1965  J. C. WHYTE  3,177,707
TESTING EQUIPMENT FOR FUEL INJECTION ENGINES
Filed April 13, 1962  2 Sheets-Sheet 2
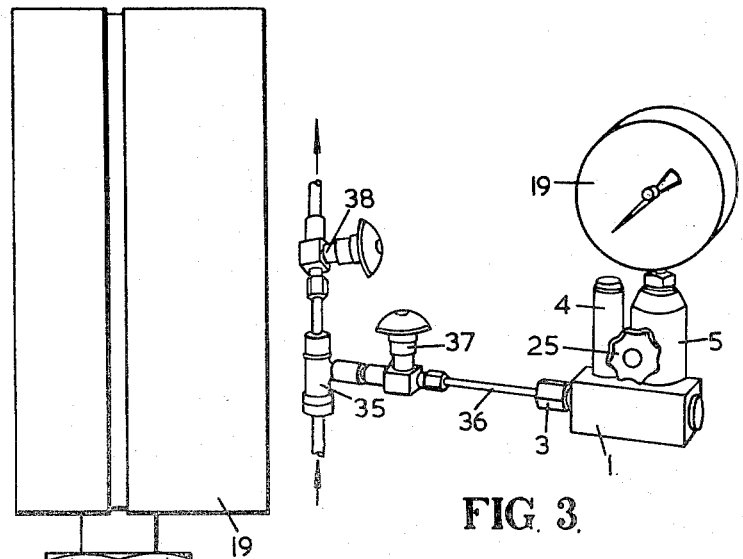
FIG. 3.
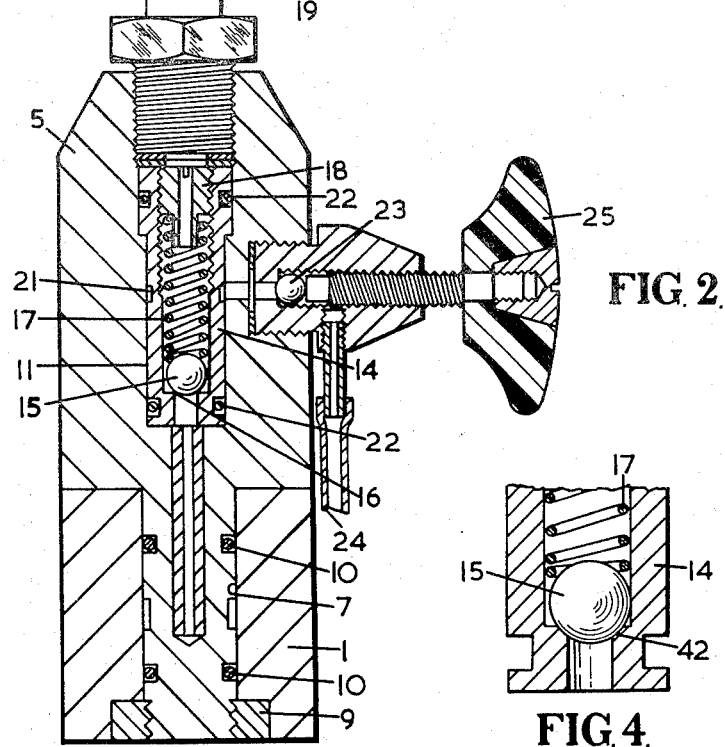
FIG. 2.
FIG. 4.
INVENTOR
Nina Whyte,
executrix of the estate
of John Christopher Whyte
BY Mawhinney & Mawhinney
ATTORNEYS

United States Patent Office 3,177,707
Patented Apr. 13, 1965

3,177,707
TESTING EQUIPMENT FOR FUEL
INJECTION ENGINES
John Christopher Whyte, deceased, late of London, England, by Nina Whyte, executrix, 185 Dollis Hill Lane, London NW. 2, England, now by change of name Nina W. Tetsios
Filed Apr. 13, 1962, Ser. No. 187,438
Claims priority, application Great Britain, Apr. 19, 1961, 14,084/61
7 Claims. (Cl. 73—119)

The invention relates to testing equipment for fuel injection engines and has an object the provision of testing equipment, including an instrument, whereby the fuel pump and injectors of an engine can be tested in situ and under working conditions.

According to the invention, the equipment includes an instrument for connection in a fuel line leading from a fuel pump of a fuel injection engine, the instrument comprising a block having a longitudinally-extending bore therein, closed at one end and communicating at the other end with inlet means by which the block can be connected to the fuel line, a relief valve, mounted on the block and communicating with the bore therein, and a pressure gauge mounted on the block and communicating through valve means with the bore in the block at a position spaced from the relief valve, the valve means including a damping valve member biased towards a seat therefor and a leak path around the valve member, the leak path preventing the valve member from complete closure, when the pressure in the bore falls below a predetermined value, above which the value member will open against its bias, the said predetermined pressure being lower than that at which the relief valve will open.

Preferably, the valve means is positioned within a hollow pillar, mounted on the block and supporting the pressure gauge. The valve means may conveniently comprise a cartridge-like element which can be inserted into or removed from the pillar, the element containing the seat and the valve member.

The invention also includes a T pipe convention, having its cross limbs, arranged to be connected in a fuel line between a delivery valve of the fuel pump and an associated fuel injector, and its centre limb arranged to be connected via a stop valve to the inlet means on the instrument.

By way of example, one form of a testing instrument according to the present invention will now be described with reference to the accompanying drawings, in which:

FIGURE 2 is a section on the line II—II in FIGURE 1,

FIGURE 3 is a diagram illustrating the pipe connection to the instrument in FIGURES 1 and 2, and FIGURE 4 is a part of FIGURE 3 drawin to a larger scale.

Figure 1:
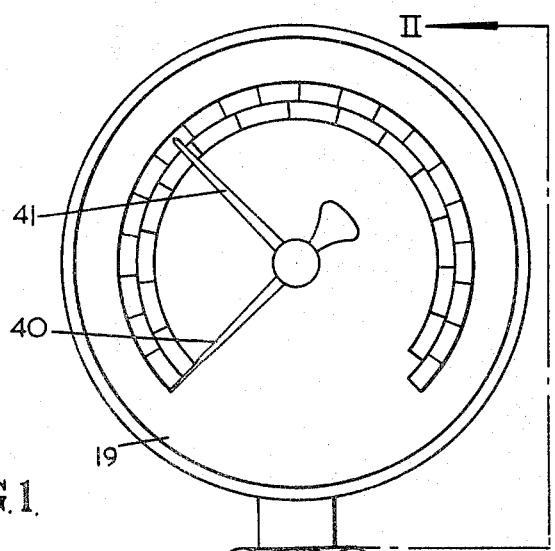
FIGURE 1 is a part-sectional, front elevation of the instrument.
Figure 1:
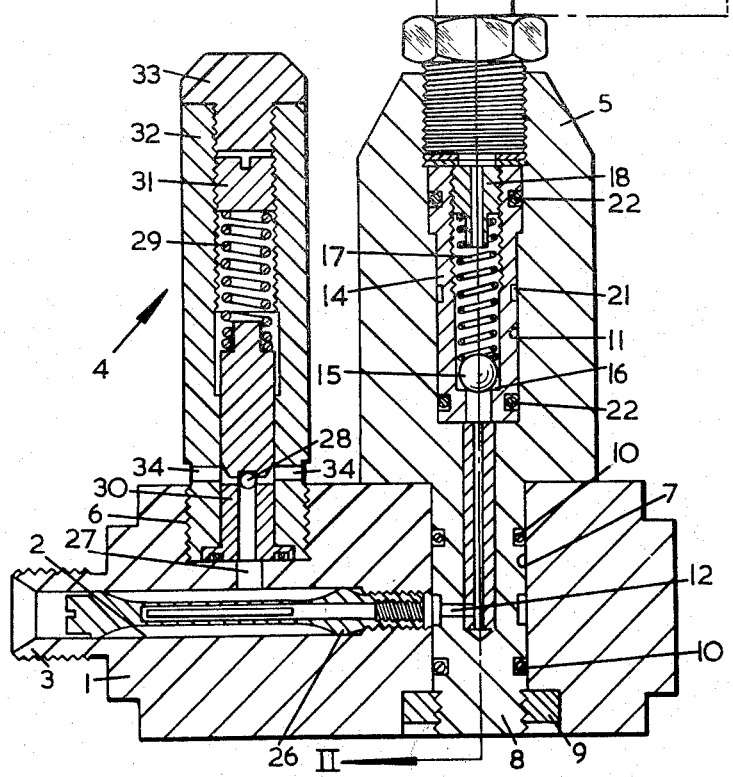

Referring particularly to FIGURES 1 and 2, it will be seen that the instrument comprises a block 1 having a longitudinally-extending bore 2 formed therein. The bore is closed at the right hand end, as viewed in FIGURE 1, by the material of the block and is provided at the other end with an externally screw-threaded inlet connected 3 to which can be connected a pipe 36 communicating with a fuel line leading from the fuel pump of a fuel injection engine (see FIGURE 3).

The block 1 supportes a removable spring-loaded relief valve assembly 4 (described in detail hereinafter) which is sealingly engaged in a socket 6 in the block and which communicates with the bore 2. The block 1 also supports a hollow pillar 5, which is sealingly engaged in a tranverse hole 7 in the block 1 and also communicates with the bore 2, at a position downstream of the relief valve 4. The pillar 5 has a root portion 8, which is fitted into the hole 7 and is secured therein by a locking ring 9. The pillar has a bore 11 formed therein which communicates with the bore 2 in the block 1 through a passage 12 formed in the root portion 8. Sealing rings 10 are provided above and below the passage 12 to restrict leakage of fuel from the instrument. The bore 11 in the pillar 5 contains a removable hollow cartridge-like element 14, containing a spring-biased valve member 15. The upper end of the pillar 5 carries a pressure gauge 19, which communicates with the bore 2 via the interior of the element 14 and the valve member 15 therein. The valve member 15 is in the form of a ball engageable with a seat 16 formed in the element 14 and is biased by a spring 17 into engagement with the seat 16. The compression of the spring 17 can be pre-adjusted by means of a bored plug 18 in screw-threaded engagement with a bore in the element 14. The seat has a permanently open leak path 42 of small cross-section shown in FIGURE 4 but not shown in FIGURE 1, thereby preventing the ball from completely closing the seat 16. The element 14 has at least one hole (not shown) formed therein, downstream of the ball 15, whereby the bore in the element is placed in communication with an annular channel 21, formed in the outside wall of the element 14 and bounded by the cylindrical wall forming the bore in the pillar 5. Sealing rings 22 located in annular recesses in the outside wall of the element 14 are provided above and below the channel 21. The channel 21 communicates with atmosphere through a bleed valve 23, also in the form of a ball, and a bleed pipe 24 (see FIGURE 2). The ball valve 23 is opened and closed by means of a manually-operable control knob 25.

The bore 2 of the block 1 contains a flow restrictor 26 which restricts the flow of fuel to the passage 12 and hence the pressure gauge 19.

Fuel also flows from the bore 2 to a tranverse passage 27 formed in the block 1 and communicating with the interior of the root portion of a tubular housing 32 of the safety valve assembly 4. This contains a valve member also in the form of a ball 28 which is biased by a spring 29 into contact with its seating 30. The loading on the spring 29 can be adjusted by means of a screwed plug 31 at the top of the tubular housing 32. The latter is closed by a cap 33. When the fuel pressure in the bore 2 reaches a predetermined value, the ball 28 will be lifted from its seating against the bias of the spring 29 and will allow fuel to escape to atmosphere through vent holes 34 at the lower end of the housing 32.

The instrument is used in conjunction with a T pipe connection 35 (see FIGURE 3) which is connected with its cross limbs in a fuel line leading from a fuel pump of an engine (not shown) and leading to an associated fuel injector (not shown). The centre limb of the T connection 35 is connected by a pipe 36 via a manually-operable stop valve 37 to the inlet connection 3 in the block 1. In practice, each cylinder of an engine may have a T connection 35 permanently connected in the fuel line between the fuel pump and the appropriate fuel injector and communicating with a pipe 36 containing a stop valve 37, whereby the testing instrument shown in FIGURES 1 and 2 can be connected to any one of the pipes 36 as desired, while the engine is operating.

To use the instrument, it is connected to the appropriate pipe 36, communicating via the stop valve 37 with the centre limb of the T connection 35. The stop valve 37 is opened and this allows fuel to flow under pressure to the bore 2 in the block 1. The bleed valve 23 is then opened by means of the manually-operable knob 25 to allow the fuel to exclude air from the instrument. On closing the bleed valve 23, assuming that the fuel pump is operating correctly, the pressure gauge 19 will register the maximum pressure occurring in the fuel line i.e. the cracking pressure or the pressure at which the injector will open and deliver fuel into the cylinder. The ball 15 will act to damp pressure fluctuation and will thus reduce or substantially eliminate oscillation of the pointer 40 of the pressure gauge, provided that the fuel pump and injector are working normally. The pressure gauge may also be provided with a manually-adjustable pointer 41, which can be set at the correct cracking pressure for which the injector has been designed. Thus the operator can easily see whether the cracking pressure, as actually measured by the pointer 40, substantially coincides with that indicated by the manually adjustable pointer 41. If the reading observed differs considerably from the design value or the pointer 40 oscillates excessively, the injector may be faulty or dirty and should be removed for checking.

As well as testing the fuel injectors of an engine in situ under working conditions, the instrument also enables the injectors to be correctly balanced or set to the recommended cracking pressure. Each injector is separately tested and correctly balanced by connecting the instrument to each pipe 36 in turn. In the event of a blocked injector, the high increase in pressure will operate the relief valve 28 and hence protect the pressure gauge 19 from damage.

The foregoing description is based on the assumption that the fuel pump is operating correctly; but before an injector is tested, the associated pumping element and control valve of the fuel pump should be tested. This may be done by providing a stop valve 38 in each fuel line downstream of the T connection 35. By closing the stop valve 38 and opening the valve 37 in the line to which the instrument is connected, the instrument will record fuel pump delivery pressure and will not be influenced by the operation of the injector.

The equipment according to this invention may be used with marine or large stationary engines, in which case stop valves 38 between the T connections 35 and the injectors need not be provided. Instead each T connection 35 could be removed in turn, when the engine is not running. For example, in the case of a marine engine, when the ship is in port, a testing instrument according to this invention may be connected directly to the appropriate delivery port or line of the fuel pump. The fuel pump is then operated manually, and as the pump speed is increased, the pressure gauge 19 should show a uniform rise in pressure to an appropriate value; but a worn pump element will show a more erratic rise to a lower pressure. The fuel pressure acting on the gauge 19 can then be relieved by opening the bleed valve 23. If before the bleed value 23 is opened, the fuel pump is stopped, a drop in pressure indicated by the pointer 40 would show that the delivery valve of the pump should be cleaned or replaced.

In marine or large stationary fuel injection engines, the bore of the fuel line between the pump and the injector is often larger than the standard bore used with smaller engines. The use of the T connection 35 enables a pipe of standard bore to be connected to the centre limb and pipes of larger bore to be connected to the cross limbs.

The use of a cartridge-like valve element 14 in the pillar 5, enables the valve element to be replaced easily when it has become damaged or worn, without the need to send the whole instrument to the manufacturer. It will be appreciated that the seating of the ball 15 in the seat 16 in order to form the correct leak path is extremely critical and cannot easily be adjusted after initial assembly.

It may be desirable to alter the pressure at which the ball 15 in the element 14 will open, in order to test injectors having cracking pressures which differ considerably from the cracking pressures of standard injectors. In this case, provision may be made for adjusting the valve element 15 from outside the pillar 5 so that the element will open at the said different pressures.

What I claim as the invention and desire to secure by Letters Patent of the United States is:

1. Fuel injection testing equipment comprising a block having a bore therein, closed at one end and communicating at the other end with inlet means by which said block is, in use, connected to a fuel line, leading from a fuel pump to an injector of a fuel-injection, internal combustion engine, a relief valve, mounted on said block and communicating with the bore therein, a vent in said block communicating with atmosphere and with said bore via said relief valve, a pressure gauge mounted on said block and communicating with the bore in said block at a position spaced from said relief valve and in parallel with said relief valve, and valve means between said pressure gauge and said bore, said valve means including a damping valve member, a seat towards which said valve means is biased and a permanently-open leak path around said valve member.

2. Equipment as claimed in claim 1 in which said valve means is positioned within a hollow pillar, mounted on said block and supporting said pressure gauge.

3. Equipment as claimed in claim 2 in which said valve means comprises a removable cartridge-like element, said element containing said seat and said valve member.

4. Fuel injection testing equipment comprising a block having a bore therein, closed at one end and communicating at the other end with inlet means by which said block is, in use, connected to a fuel line, leading from a fuel pump to an injector of a fuel-injection, internal combustion engine, a relief valve, mounted on said block and communicating with the bore therein, a vent in said block communicating with atmosphere and with said bore via said relief valve, a hollow pillar, mounted on said block and communicating with the bore therein at a position spaced from said relief valve, a pressure gauge mounted on said pillar and communicating with the bore in said block at a position spaced from said relief valve and in parallel with said relief valve, and valve means positioned within said pillar and comprising a removable cartridge-like housing, a damping valve member, movable in said housing, a seat in said housing towards which said valve means is biased and a permanently-open leak path around said valve member, and said instrument including a manually-controllable bleed valve mounted on said pillar and communicating with the interior thereof at a position between said pressure gauge and said valve member.

5. Fuel injection testing equipment comprising a block having a bore therein, closed at one end and communicating at the other end with inlet means by which said block is, in use, connected to a fuel line, leading from a fuel pump to an injector of a fuel-injection, internal combustion engine, a relief valve, mounted on said block and communicating with the bore therein, a vent in said block communicating with atmosphere and with said bore via said relief valve, a hollow pillar, mounted on said block and communicating with the bore therein at a position spaced from said relief valve, a pressure gauge mounted on said pillar and communicating with the bore in said block at a position spaced from relief valve and in parallel with said relief valve, and valve means positioned within said pillar and comprising a removable cartridge-like housing, a damping valve member in the form of a ball, movable in said housing, a seat in said housing towards which said valve means is biased and a permanently-open leak path around said valve member, and said instrument including a manually-controllable bleed valve mounted on said pillar and communicating with the interior thereof at a position between said pressure gauge and said valve member.

6. Fuel injection testing equipment comprising a block having a bore therein, closed at one end and communicating at the other end with inlet means by which said block is, in use, connected to a fuel line, leading from a fuel pump to an injector of a fuel-injection, internal combustion engine, a relief valve, mounted on said block and communicating with the bore therein, a vent in said block communicating with atmosphere and with said bore via said relief valve, a hollow pillar, mounted on said block and communicating with the bore therein at a position spaced from said relief valve, a pressure gauge mounted on said pillar and communicating with the bore in said block at a position spaced from said relief valve and in parallel with said relief valve, and valve means positioned within said pillar and comprising a removable cartridge-like housing, a damping valve member, movable in said housing, a seat in said housing towards which said valve means is biased and formed in said seat a permanently-open leak path around said valve member, and said instrument including a manually-controllable bleed valve mounted on said pillar and communicating with the interior thereof at a position between said pressure gauge and said valve member.

7. In a fuel injection engine having a fuel pump and a fuel injector, fuel injection testing equipment comprising a block having a bore therein, closed at one end and having a pipe connection at its other end, a relief valve, mounted on said block and communicating with the bore therein, a vent in said block communicating with atmosphere and with said bore via said relief valve, a pressure gauge mounted on said block and communicating with the bore in said block at a position spaced from said relief valve and in parallel with said relief valve, and valve means between said pressure gauge and said bore, said valve means including a damping valve member, a seat towards which said valve means is biased and a permanently-open leak path around said valve member, said equipment also including a T pipe connection, having its cross limbs, arranged to be connected between said fuel pump and said fuel injector, and its centre limb connected to said pipe connection, and a stop valve between said centre limb and said pipe connection.

References Cited by the Examiner
UNITED STATES PATENTS

| | | | |
|---|---|---|---|
| 323,992 | 8/85 | Wilcox | 73—388 |
| 643,876 | 2/00 | Lane | 73—392 X |
| 938,522 | 11/09 | Swain | 73—389 X |
| 1,996,060 | 4/35 | Bijur | 73—392 X |
| 2,028,265 | 1/36 | Winnen | 137—513.5 |
| 2,372,456 | 3/45 | Stewart | 137—513.5 X |
| 2,522,007 | 9/50 | Willach | 73—389 |
| 2,603,092 | 7/52 | Buffenmyer | 73—392 |
| 2,936,000 | 5/60 | Mason | 73—420 X |

FOREIGN PATENTS

| | | |
|---|---|---|
| 859,341 | 6/40 | France. |
| 437,161 | 10/35 | Great Britain. |

RICHARD C. QUEISSER, *Primary Examiner.*

DAVID SCHONBERG, *Examiner.*